Aug. 23, 1966  R. G. OSTENSEN  3,268,718
LIGHT REFLECTOR ASSEMBLY
Filed May 9, 1963  2 Sheets-Sheet 2
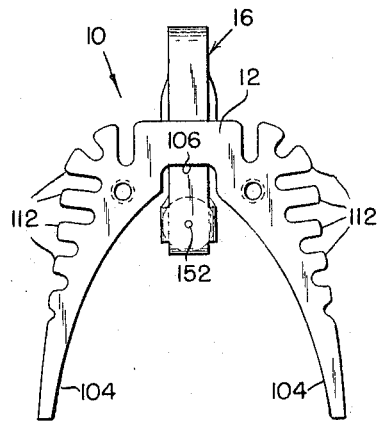
*Fig.-3*
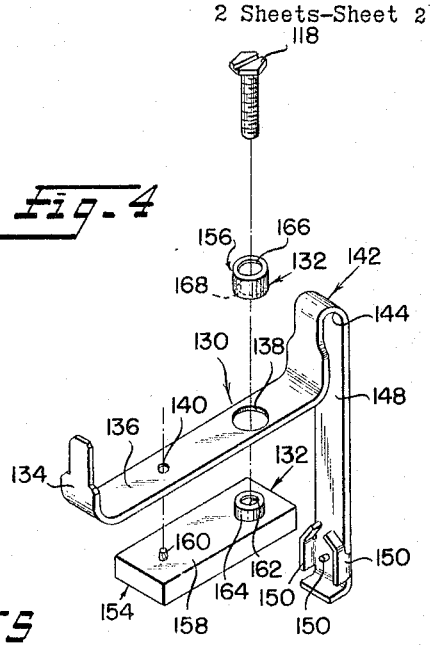
*Fig.-4*
*Fig.-5*
PRIOR ART
*Fig.-6*
INVENTOR
Ralph G. Ostensen
BY
Strauch, Nolan & Neale
ATTORNEYS

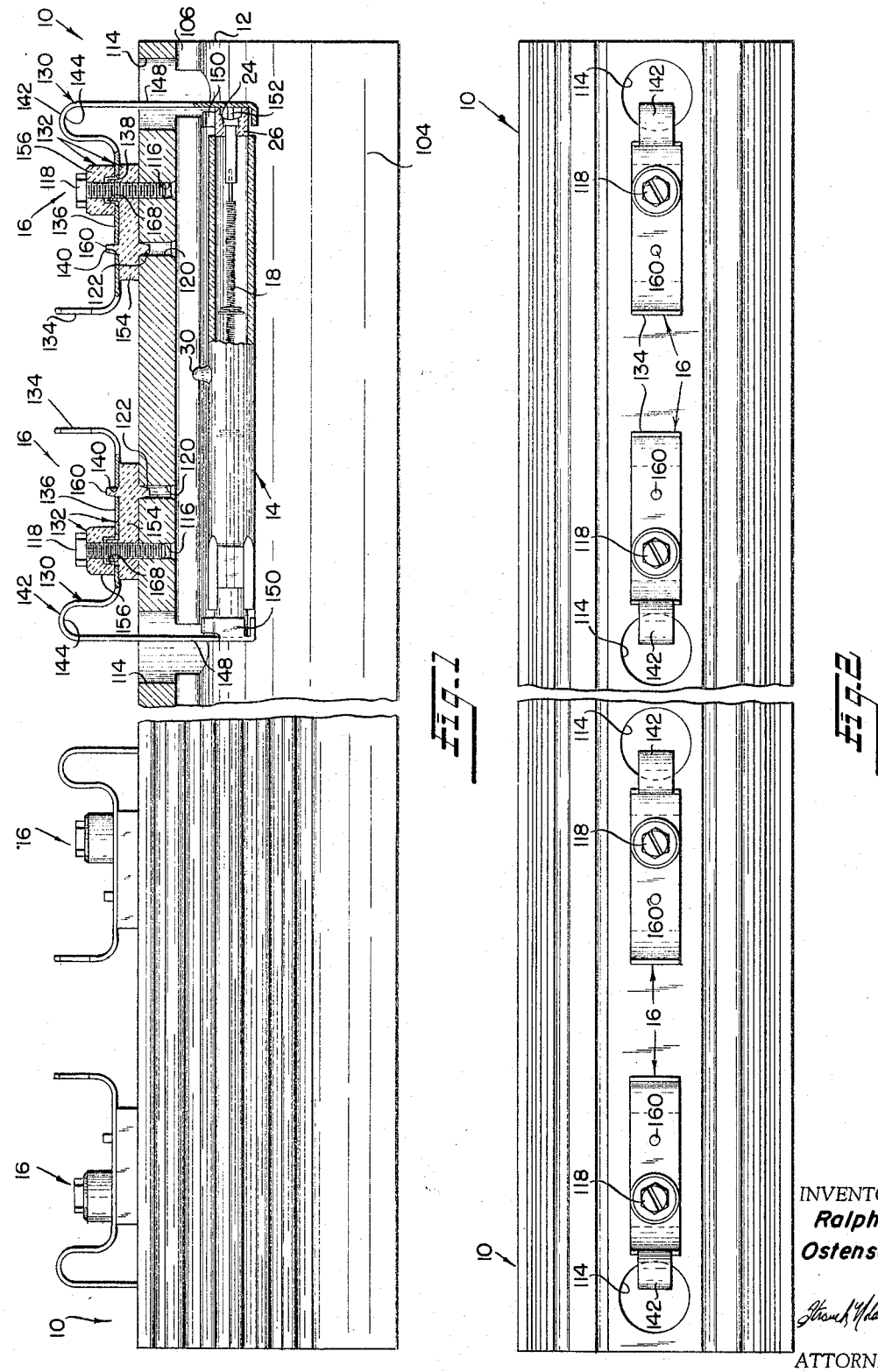

United States Patent Office 3,268,718
Patented August 23, 1966

3,268,718
LIGHT REFLECTOR ASSEMBLY
Ralph G. Ostensen, Morton Grove, Ill., assignor to SCM Corporation, New York, N.Y., a corporation of New York
Filed May 9, 1963, Ser. No. 279,276
14 Claims. (Cl. 240—41.35)

The present invention relates generally to lensless illuminating and light intensifying apparatus and, more particularly to light reflecting and directing housing and associated contact assembly members for micrifying the light emitted from a high intensity line light source in a photocopy machine.

Considerable efforts have been made in the prior art toward methods and apparatus for projecting light onto a given surface or object. Concave reflecting surfaces of circular, elliptical, and parabolic contour and combinations thereof have been used with varying results for varying purposes. For micrifying purposes, that is to intensitfy and concentrate reflected light from a source to an area at a predetermined location of lesser size than the area of the source, while minimizing the non-reflected stray light, circular and spheroidal reflecting surfaces have proved to be inadequate permitting an excessively high amount of non-utilized, non-reflected stray light to escape and most often such surfaces dictate the use of lenses and/or prisms to properly converge the light rays to a small predetermined focus area. Similarly, concave elliptical reflecting surfaces with a light source approximately at the enclosed focal point will, of course, concentrate the reflected light at the other non-enclosed focus point, making long distance convergence of the light impossible without prismatic or optical aid. Also, parabolic reflecting surfaces per se are, with a light source approximately at the focal point, deficient since they reflect a series of parallel, non-micrified rays of light cumulatively equal to the width of the mouth of the parabolic reflective surfaces and therefore require special optical refraction-facilitating apparatus to convergingly micrify the rays of light to any desired diminutive area.

Accordingly, a primary object of the present invention, is to provide a novel line light source lamp housing having a modified parabolic reflecting surface for micrifying reflected light into an area substantially less than the area of the mouth of the reflecting surface to increase the intensity of the light without use of optical refraction-facilitating apparatus.

Another object of this invention is to provide a novel light reflecting housing assembly having a modified parabolic reflecting surface and a channel shaped recess at the apex thereof for enveloping three sides of a cylindrically shaped lamp and enabling the focal length of the reflector surface to be quite small and the lamp to be physically situated at or near the focus point of the reflector surface near the recess. By this mounting arrangement the envelope for the lamp may partially extend into the recess while remaining in spaced relation from the reflecting surface thus permitting effective cooling of the lamp by air circulation without appreciable loss in light radiating efficiency and yet attaining an adequate control over loss in stray, non-reflected light.

Still another important object of the invention is to provide a novel electrical contact assembly including a pair of flexible contact arms for supplying operating power to and physically supporting an elongated light source having terminals on opposite ends of a cylindrical envelope and novel heat resistant insulating members for mounting the contact assembly and lamp to a light reflecting housing. The flexible contact arms are uniquely devised to accommodate variations in length of the high intensity lamps as are commercially available and expansions and contractions in length of the lamp housing due to high temperatures produced during operation of the lamp. The contact assembly is also peculiarly well adapted for mounting on an outside wall of a reflector housing to enable two or more of such lamps to be mounted in end to end relation along the approximate focal line of the reflective surface.

These and other objects of the present invention will become more fully apparent from the appended claims as the ensuing detailed description and discussion proceeds in conjunction with the accompanying drawings in which:

FIGURE 1 is a partial longitudinal cross-section view in elevation of a light reflector assembly, illustrating the inter-relationship of the light source, the reflector housing, and the contact assembly of one embodiment of the present invention;

FIGURE 2 is a plan view of the light reflector assembly of FIGURE 1;

FIGURE 3 is an end view of the light reflector assembly of FIGURE 1;

FIGURE 4 is an exploded perspective view of the contact assembly of FIGURE 1;

FIGURE 5 is a diagrammatic view showing a parabolic reflector with a light source at the focal point and illustrates the non-reflected stray light rays and the reflected parallel light rays; and FIGURE 6 is a diagrammatic view similar to FIGURE 5 illustrating the modified parabolic reflecting surface and the associated micrified reflected light rays of the present invention, wherein a channel shaped recess is located at the vertex of the reflecting surface, and a line light source is physically situated adjacent the recess at approximately the focal point of the reflecting surface.

Referring now to the drawings and in particular to FIGURES 1 and 2, there is shown one preferred embodiment of the present invention. Reflector assembly 10 consists of reflector housing 12, a pair of lamps with only lamp 14 being shown in FIGURE 1, that are mounted in spaced relation to housing 12 by four identical electrical contact assemblies 16, two for each lamp.

Lamp 14 is a high performance light, commercially available from General Electric Company as 500T 3Q/CL/3 having a length of about 4½ inches and a cylindrical envelope having a diameter on the order of ⅜ inch. Such a lamp is rated at 500 watts and has a surface temperature of roughly 800° F. during operation. The light emitting filament coil 18 is connected at its respective ends with recessed contact pin 24, and is in effect a line light source. Recessed contact pin 24 is housed within a ceramic end fitting 26.

This type of line light source lamp is apparently difficult to manufacture and longitudinal dimensional variations from lamp to lamp are as much as ⅛ inch. An additional length variation due to temperature changes must also be accommodated by the lamp mounting means without excessive compressive force on the housing. To utilize such a lamp in conjunction with a somewhat narrow parabolic reflector, several problems are posed which relate to placement of the lamp at or near the focal point of the reflecting surface for guiding the available light onto a rectangular imaging area of an office photocopy machine, as well as a physical support for the lamp.

Before describing further the reflector assembly of FIGURES 1–4, reference will be made to FIGURES 5 and 6 which describe the manner by which the specific shape of the reflecting surface is devised. FIGURE 5 illustrates a conventional true parabolic reflecting surface 40 being symmetrical about axis of symmetry 41 and having a line light source 42 located at the focal point 44.

The focal distance $f$ is, by definition, the distance from vertex 46 to focal point 44. As viewed in FIGURE 5, it is easily appreciated how an envelope 48 for the light source becomes a limiting factor when attempting to concentrate the light in a relatively small area. Light emitting from lamp 42 includes non-reflected stray light rays 50 and source radiated light rays 52, which reflect from reflecting surface 40 into parallel light rays 54 which cover an area equal in width to the width of the open mouth of reflecting surface 40 and illuminating an area equal to the area of the mouth of surface 40, the width of which is shown by $h$.

By placing lamp 42 to the right, as viewed in FIGURE 5, of focal point 44 so as to be farther outward from vertex 46, would cause source radiated light rays 52 to reflect from parabolic reflecting surface 40 essentially in the form of converging paths of parallel rays intersecting each other at various distances from focal point 44. It is apparent that by so positioning lamp 42, the relative percentage of non-reflected stray light rays 50 is also markedly increased.

If a larger reflector were used so that the lamp would appear smaller in diameter than lamp 40 and placed leftward of focal point 44 as shown in FIGURE 5, to a position nearer to vertex 46, source radiated light rays 52 would reflect from parabolic reflecting surface 40 forming substantially two parallel divergent paths of rays. Therefore, special optical equipment would be required in order to micrify such divergingly directed rays of light into an area smaller than the area of the mouth of parabolic reflecting surface 40. Hence, by placing a lamp in any position within a true parabolic reflecting surface great difficulty is encountered in micrifying the area of reflected light rays into a desired smaller area at a given distance therefrom and also simultaneously minimizing the percentage of non-reflected stray light rays.

As illustrated in FIGURE 6, the present invention provides means for producing micrified reflected rays of light while minimizing the percentage of non-reflected stray light rays by use of a modified parabolic reflecting surface 60 formed of two different, but congruent parabolas 62 and 64 each having an axis of symmetry, 66 and 68, respectively, and an approximately common focal point. Upwardly inclined parabola 62 having axis 66, includes parabolic legs 70 and 72 while downwardly inclined parabola 64, having axis 68, includes parabolic legs 74 and 76. Parabolic legs 72 and 74 combine to form modified parabolic reflecting surface 60, which has a central plane 78 that bisects parabola axes 68 and 66. The particular arrangement of modified parabolic reflecting surface 60 enables source radiated light rays 82 to be reflected from parabolic leg 74 in parallel paths 84 and from parabolic leg 72 in parallel paths 86, without materially affecting the percentage of non-reflected, stray light rays 88. By appropriate choice of angle between parabola axes 66 and 68 relative to the distance $g'$ to the area to be illuminated, the reflected light from each parabola leg may be concentrated on the same area having a width $h'$ as shown in FIGURE 6, and the width $h'$ of illuminated area may be reduced to approximately one-half the corresponding width of the mouth of modified parabolic reflecting surface 60. This thereby utilizes the available light in an optimum manner, and is particularly well suited for several existing office type photocopy machines.

FIGURE 6 further shows a channel-shaped recess 90 at the location of the vertex of modified parabolic reflecting surface 60. This permits a portion of envelope 94 of lamp 92 to extend slightly beyond focal distance $f'$ toward channel-shaped recess 90 and thereby enables use of a focal distance equal to or even slightly less than the radius of lamp envelope 94. Sufficient space is provided for air circulation to reduce excessive temperatures on lamp 92 and no significant decrease in illumination efficiency results.

One practical embodiment employing a modified parabolic reflecting surface as illustrated in FIGURE 6 at 60, is illustrated in FIGURES 1–3 and includes a lamp of the type identified above. The channel-shaped recess may have a depth of 3/16 inch and a width of 3/8 inch, approximately. The reflecting surface may have parabolic leg lengths of 2 inches each and a mouth opening of slightly over 2 inches while utilizing the lamp identified above.

The reflector assembly 10 of FIGURES 1, 2, and 3 utilizes the reflective surface as described above. Reflector housing 12 preferably is extruded aluminum and is thus provided with a modified parabolic inner reflecting surface 104 and channel-shaped recess 106. Radiating fins 112 may be integrally formed on the external surface of reflector housing 12 during extrusion near the position of lamps 14 to facilitate heat dissipation.

Housing 12 is provided with suitable through apertures 114, 116 and 120 for each of the electrical contact assemblies 16. As best seen in FIGURE 1 in partial cross section and in FIGURE 2, all of the apertures are through the rear wall of recess 106. Apertures 114, for receiving resilient contact arm 148 of electrical contact assembly 16, are located at opposite ends of lamp 14. Apertures 116 may be threaded to receive fastener 118, and apertures 122 serve to anchor the contact assemblies 16 in place as described below.

Each electrical contact assembly 16 of the present invention, shown in its installed position at the right hand portion of FIGURE 1 and with its members disassembled in FIGURE 4, includes contact member 130, which is formed of a flexible conducting material and bent into a serpentine shape, and a two piece insulator 132. Contact member 130 has at one end of its serpentine shape a leg 134 adapted to be received into power supply socket (not shown). Central portion 136 is provided with through apertures therein at 138 and 140. On the other end, a loop 142 is formed consisting of a reverse bend at 144 which terminates in an arm 148 that is capable of considerable swinging to and fro movement in a common central plane which includes the axes of leg 134 and central portion 136. Loop 142 markedly enhances the flexing ability arm 148 to accommodate lamp 14 in electrical contact assembly 16, which as explained above, not only undergoes considerable longitudinal expansion and contraction due to temperature changes, but also is sold commercially with considerable variation in length dimensions.

As illustrated in FIGURE 4, resilient arm 148 has at its terminal end thereof, integrally formed transverse guards 150 to firmly position lamp 14 after installation 148 and contact pin 152, preferably of nickel, adapted to abut in contact relation contact pin 24 of lamp 14 so the lamp is actually supported entirely between a pair of resilient arms 148.

The two piece insulator 132 may comprise a plate-like base 154 and cap 156, each made of a heat-resistant insulating material such as porcelain. Base 154 may have a flat body portion 158 formed with oppositely directed, axially aligned integral extensions 122 and 160 and an integral boss 164 having an aperture 162 having a smooth bore. Cap 156 has a smooth through bore 166 and a counterbore like recess 168 to fit over boss 164 of base 154 when assembled.

When in assembled position, as shown in FIGURE 1, base 154 is initially fitted upon reflector housing 12 by insertion of extension 122 into aperture 120 of reflector housing 12. Thereafter, contact member 130 is placed over top of base 154 with aperture 138 fitting over boss 164 and aperture 140 fitting over extension 160 to provide a pair of spaced interlocking portions that anchor conductive member 130 to reflector housing 12. Arm 148 passes through aperture 114 on housing 12 to thus be electrically isolated from the remainder of the reflector assembly. Cap 156 may then be placed over contact member 130 so that counterbore recess 168 seats over the top of boss 164 and a fastener such as cap screw 118, inserted through aperture 166 of cap 156, through aperture 162 of base 154, and threadedly engaged with aperture 116 of reflector housing 12. The entire contact assembly is thus rigidly anchored to reflector housing 12, and yet the free ends 134 are available to be connected to a supply socket.

In summary, it is seen that a novel compact reflector assembly is provided having a modified parabolic reflecting surface to micrify and intensify the available light from a high performance line light source of small size that is adapted for use in reasonably small equipment such as an office or desk sized photocopy machine. The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A light reflector assembly for a photocopy machine comprising:
    (a) an elongated housing having a highly reflective inner surface shaped to have the general configuration of a parabola in transverse cross-section and having a straight longitudinal axis and a channel shaped recess containing at least three axially spaced through apertures at the vertex;
    (b) a light source including a pair of axially spaced lamps each having a cylindrically shaped envelope wall having a longitudinal axis parallel to the housing axis and located at approximately the focal point of the reflective surface, the envelope wall of each of said lamps extending toward but being spaced from the walls of said recess, the diameter of the cylindrical envelope wall of each of said lamps being substantially equal to the width of the channel shaped recess;
    (c) contact terminals on opposite ends of each of said lamps; and
    (d) contact means extending through said spaced apertures and being electrically insulated from the walls of said apertures in said housing for mounting said lamps substantially parallel to the longitudinal axis of said housing in axially spaced relationship within said housing.

2. The light reflector assembly as defined in claim 1 wherein the contact means comprises:
    (a) resilient contact arms having first legs secured to an outer surface of said housing and insulated from said housing; and
    (b) second legs on said arms having terminal portions for engaging the contact terminals on said lamps to thereby provide a mounting arrangement for the lamps to accommodate commercial variations in the length of the lamps as manufactured and variations in the length of the lamps due to temperature expansion and contraction.

3. The light reflector assembly as defined in claim 2 wherein:
    (a) the cylindrical wall of the light source is formed of a temperature resistant glass;
    (b) the diameter of the cylindrical wall is substantially equal to the width of the channel-shaped recess in the reflective surface; and
    (c) the housing is formed of extruded aluminum and provided with integral radiating fins of the outer surface thereof adjacent the location of the light source.

4. An elongated, unitary light reflector member having a modified parabolic light reflecting surface adapted to reflect and direct light from a line light source approximately located at the focal point through the mouth of said light reflecting surface, said light reflecting surface having first and second parabolic legs which are legs of separate, congruent imaginary parabolas, but which are disposed to be symmetrical about a central plane of said reflector member, the axis of symmetry of each of said imaginary parabolas being angularly disposed relative to said central plane and located on the side of said central plane opposite from its associated parabolic leg to thereby cause the area of the reflected light at a predetermined distance from the mouth of the reflector member to be substantially less than the area of the mouth of said reflector member, said light reflecting surface having a channel-shaped recess at the apex of said first and second parabolic legs, said line light source being located approximately at the focal point of said modified parabolic light reflecting surface, said light source having a cylindrical envelope which extends toward but is spaced from the walls of said recess, the distance from the base of said recess to the axis of said light source at said focal point being approximately equal to the diameter of said cylindrical envelope, the length of each parabolic leg being on the order of 5 times the diameter of the envelope, and the mouth opening of said reflector member being less than about 6 times the diameter of the envelope.

5. The unitary light reflector member as defined in claim 4 wherein said reflector member is extruded aluminum and has radiating fins on the outer surface thereof in the region about said light source.

6. A light reflector assembly for a photocopy machine comprising:
    (a) an elongated housing having a highly reflective inner surface shaped to have the general configuration of a parabola in transverse cross-section and having a straight longitudinal axis and a channel-shaped recess at the vertex, said channel-shaped recess containing a plurality of apertures therein; and
    (b) a light source enclosed in a cylindrically-shaped envelope wall having a longitudinal axis parallel to the housing axis and located at approximately the focal point of said reflective surface, the radius of said cylindrical envelope wall being on the same order of magnitude as the focal length of the reflective surface so that said envelope wall extends toward but is spaced from the walls of said recess;
    (c) contact terminals on opposite ends of said light source; and
    (d) contact means secured to and insulated from said housing comprising:
        (1) resilient contact arms having serpentine shape with a central leg and two end legs all having a common central plane, the end legs being angularly disposed relative to the central leg, and being substantially oppositely directed from one another, one of said legs including a short radius reverse bend adjacent said central leg;
        (2) means for securing the central leg in spaced relation to the outside of said housing comprising a pair of bodies of heat-resistant insulating material interfitting with each other, located on separate sides of said central leg and attached thereto in at least two independent locations; and
        (3) fastener means securing said central leg to said bodies of insulating material and for securing one of said bodies to said housing, whereby one of said end legs on each of said resilient contact arms is adapted for connection with a power supply socket and whereby the other of said end legs on each of said resilient contact arms has terminal portions extending in spaced relationship through one of said apertures in said channel-shaped recess to resiliently hold said light source in position while supplying power to the contact terminal of said light source, thereby providing mounting arrangement for the light source to accommodate commercial variations in the length of the light source as manufactured and variations in the length of the light source due to temperature expansion and contraction.

7. The light reflector assembly as defined in claim 6 wherein the central leg of said resilient arms has two apertures therein and at least one said bodies of insulating material has extensions engaging said apertures; and wherein said fastening means extends through said bodies and said central leg without contacting the central leg and is threadedly received in said reflector housing.

8. An electrical contact assembly for supplying operating power to an elongated light source having contact terminals on opposite ends thereof and supporting said light source on a housing having a light reflecting surface comprising:
 (a) a pair of members of conductive material mounted in spaced positions to receive a light source therebetween, each of said members having first and second legs and a central portion having a pair of spaced apertures extending between said legs;
 (b) said first leg including an end portion adapted to be received by a supply socket;
 (c) said second leg extending from said central portion and including contact means for engaging a contact terminal on said light source and being sufficiently resilient to accommodate variations in length of said light source; and
 (d) means formed of a heat-resistant insulating material for securing the central portion of each conductive member to said housing in an electrically insulating manner comprising first and second members of heat-resistant insulating material formed to have surfaces interfitting with each other and with said apertured central portion, said first and second members being located on and fixed relatively to opposite sides of said central portion; and
 (e) fastener means for securing said contact assembly together and to said housing.

9. The electrical contact assembly as defined in claim 8 wherein:
 (a) said light source contact terminals are surrounded on three sides in recessed, non-conductive sleeves;
 (b) the light source has a cylindrical envelope;
 (c) the contact means of said second leg includes a pin of heat resistant conductive material adapted to extend into said recess and engage the contact terminal of said light source.

10. In a photocopy machine an elongated, open mouth light reflector assembly comprising:
 (a) an elongated reflector housing having a longitudinal axis and a highly reflective inner surface constituting in transverse cross-section a modified parabola defined by each symmetrical one-half of a true parabola rotated through a predetermined angle toward the other one-half of said true parabola about the approximate focal point thereof;
 (b) said reflective inner surface including a channel shaped recess at the vertex thereof and apertures extending through a wall of said recess;
 (c) an outer surface on said housing including a series of ridges and grooves forming radiating fins;
 (d) a pair of high intensity light sources each having cylindrically shaped envelope walls and contact terminals at opposite ends thereof, said envelopes each having a diameter substantially equal to the width of said channel shaped recess and mounted in an end to end relation along the approximate focal line of the reflective surface to extend toward but being spaced from walls of said recess and from said reflective surface;
 (e) an electrical contact assembly for each light source comprising a pair of serpentine resilient members of conductive material each having first and second legs and a central portion therebetween all having a common central plane;
 (f) said first leg being formed to be adapted to be received by an electrical supply socket;
 (g) said second leg flexibly extending from and forming a reverse curve adjacent said central portion and extending through one of said apertures in said reflector housing in spaced relation thereto and including a terminal portion for engaging a contact terminal on said light source;
 (h) said central portion having a pair of apertures therein;
 (i) a two piece member of heat-resistant insulating material mounted on opposite sides of the central portion of said resilient conductive member and having projections engaging the apertures in said central porton and at least one of said apertures in said reflector housing; and
 (j) fastener means to secure said two piece member and its resilient conductive member to said reflector housing with said conductive member being insulated from said reflector housing and the fastener means.

11. An electrical contact assembly for supplying operating power to an elongated light source having contact terminals on opposite ends thereof and supporting said light source to a housing having a light reflecting surface comprising:
 (a) a pair of members of conductive material mounted in spaced positions to receive a light source therebetween, each of said members having first and second legs and a central portion therebetween;
 (b) said first leg including an integral end portion extending upwardly from said central portion and adapted to be received by a supply socket;
 (c) said second leg extending downwardly from said central portion and including contact means for engaging a contact terminal on said light source and being sufficiently resilient to accommodate variations in length of said light source; and
 (d) means formed of a heat-resistant insulating material for securing the central portion of each conductive member to said housing in an electrically insulating manner.

12. An electrical contact assembly for supplying operating power to an elongated light source having contact terminals on opposite ends thereof and supporting said light source to a housing having a light reflecting surface comprising:
 (a) a pair of serpentine resilient members of conductive material each having first and second legs and a central portion therebetween all having a common central plane;
 (b) said first leg being formed to be adapted to be received by an electrical supply socket;
 (c) said second leg flexibly extending from and forming a reverse curve adjacent said central portion and having a terminal at its free end portion;
 (d) said central portion having a pair of apertures therein;
 (e) a two piece member of heat-resistant insulating material mounted on opposite sides of the central portion of said resilient conductive member and having projecting portions engaging the aperture walls in said central portion; and
 (f) fastener means extending through both of said members of heat resistant insulating material and through an aperture in said central portion for securing said members together.

13. An elongated, unitary light reflector member having a modified parabolic light reflecting surface adapted to reflect and direct light from a line light source approximately located at the focal point through the mouth of said light reflecting surface, said light reflecting surface having first and second parabolic legs which are legs of separate, congruent imaginary parabolas, but which are disposed to be symmetrical about a central plane of said reflector member in fixed position relative to one another, the axis of symmetry of each of said imaginary parabolas being angularly disposed relative to said central plane and located on the side of said central plane opposite from its associated parabolic leg to thereby cause the area of the reflected light at a predetermined distance from the mouth of the reflector member to be substantially less than the area of the mouth of said reflector member, said light reflecting surface having a channel-shaped recess at the apex of said first and second parabolic legs, and said line light source being located approximately at the focal point of said modified parabolic light reflecting surface, said light source having a cylindrical envelope which extends toward but is spaced from the walls of said recess, the distance from the base of said recess to the axis of said light source at said focal point being approximately equal to the diameter of said cylindrical envelope, said light source being maintained in position by a pair of spaced resilient contact arms which are adapted to swing to and fro in said central plane so that the distance between said arms can be varied to accommodate commercial variations in the length of the cylindrical envelopes.

14. The light reflector of claim 13 wherein said channel-shaped recess contains a row of apertures spaced along the intersection of said recess wall and said central plane, said contact arms extending through said apertures and carrying terminals for engaging said light source.

References Cited by the Examiner
UNITED STATES PATENTS

| | | | |
|---|---|---|---|
| 1,603,476 | 10/1926 | Laird | 240—41.37 |
| 2,155,240 | 4/1939 | De Reamer | 339—170 |
| 2,186,951 | 1/1940 | Bergstrom | 240—41.35 |
| 2,441,456 | 5/1948 | Thayer | 240—51.11 |
| 2,722,666 | 11/1955 | Hodgkins | 339—55 |
| 2,857,578 | 10/1958 | Thomas | 339—55 |
| 2,907,870 | 10/1959 | Calmes | 240—3 |
| 2,972,675 | 2/1961 | Schiffer | 240—51.11 |
| 2,997,574 | 8/1961 | Miskella | 240—11.4 |
| 3,097,903 | 7/1963 | Moore | 339—55 |

FOREIGN PATENTS

| | | |
|---|---|---|
| 276,030 | 6/1928 | Great Britain. |
| 380,971 | 9/1932 | Great Britain. |
| 543,663 | 3/1941 | Great Britain. |

NORTON ANSHER, *Primary Examiner.*

CHARLES C. LOGAN, *Assistant Examiner.*